(12) United States Patent
Chaut et al.

(10) Patent No.: US 12,319,045 B2
(45) Date of Patent: Jun. 3, 2025

(54) NONWOVEN COMPOSITE FOR AIR FLOW APPLICATIONS

(71) Applicant: Zephyros, Inc., Romeo, MI (US)

(72) Inventors: Christophe Chaut, Molsheim (FR); Greg Thompson, Simpsonville, SC (US); Marc Engel, Lingolsheim (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 17/265,846

(22) PCT Filed: Aug. 6, 2019

(86) PCT No.: PCT/US2019/045191
§ 371 (c)(1),
(2) Date: Feb. 4, 2021

(87) PCT Pub. No.: WO2020/033339
PCT Pub. Date: Feb. 13, 2020

(65) Prior Publication Data
US 2021/0162702 A1 Jun. 3, 2021

Related U.S. Application Data

(60) Provisional application No. 62/714,981, filed on Aug. 6, 2018.

(51) Int. Cl.
*B32B 5/02* (2006.01)
*B32B 1/08* (2006.01)
(Continued)

(52) U.S. Cl.
CPC ............... *B32B 5/022* (2013.01); *B32B 1/08* (2013.01); *B32B 5/22* (2013.01); *B32B 7/12* (2013.01);
(Continued)

(58) Field of Classification Search
CPC ........... B32B 5/022; B32B 5/22; B32B 27/12; B32B 27/32; B32B 27/36; B32B 2307/102; B32B 2307/304; B32B 2605/00
See application file for complete search history.

(56) References Cited

U.S. PATENT DOCUMENTS 2,489,048 A * 11/1949 Rinehart ............... F16L 9/21
188/4 R
6,178,764 B1 1/2001 Tanaka et al.
(Continued)

FOREIGN PATENT DOCUMENTS

CH 706213 A2 9/2013
CN 101163584 A 4/2008
(Continued)

OTHER PUBLICATIONS

Espacenet translation of JP-2008281276-A (Year: 2022).*
(Continued)

*Primary Examiner* — Michael Zhang
(74) *Attorney, Agent, or Firm* — The Dobrusin Law Firm, P.C.

(57) ABSTRACT

A composite material including a plurality of discrete layers layered on top of each other. The composite material may include one or more nonwoven layers, which may be one or more needlepunched layers, one or more spun-bond layers, one or more melt-blown layers, one or more spun-laced layers, one or more air-laid layers, or a combination thereof. The composite material may include one or more fibrous material layers. The composite material may include one or more overmolded features from an injection molding process. The present teachings also contemplate methods of making the composite material.

20 Claims, 5 Drawing Sheets

(51) Int. Cl.
  *B32B 5/22*  (2006.01)
  *B32B 7/12*  (2006.01)
  *B32B 27/12*  (2006.01)
  *B32B 27/32*  (2006.01)
  *B32B 27/36*  (2006.01)
  *F24F 13/02*  (2006.01)
  *F24F 13/24*  (2006.01)

(52) U.S. Cl.
  CPC .............. *B32B 27/12* (2013.01); *B32B 27/32* (2013.01); *B32B 27/36* (2013.01); *F24F 13/02* (2013.01); *F24F 13/0245* (2013.01); *F24F 13/24* (2013.01); *B32B 2262/0253* (2013.01); *B32B 2262/0284* (2013.01); *B32B 2262/101* (2013.01); *B32B 2262/105* (2013.01); *B32B 2262/144* (2021.05); *B32B 2307/102* (2013.01); *B32B 2307/304* (2013.01); *B32B 2307/50* (2013.01); *B32B 2605/00* (2013.01); *F24F 2013/242* (2013.01)

(56) References Cited

U.S. PATENT DOCUMENTS

| | | | |
|---|---|---|---|
| 6,971,474 B2 | 12/2005 | Prosser et al. | |
| 9,243,543 B2 | 1/2016 | Bertrand et al. | |
| 2005/0020200 A1* | 1/2005 | Prosser | B60H 1/00564 454/143 |
| 2006/0225952 A1* | 10/2006 | Takayasu | G10K 11/162 181/294 |
| 2007/0066208 A1 | 3/2007 | Almori et al. | |
| 2009/0166126 A1* | 7/2009 | Patsouras | B29C 43/18 181/224 |
| 2010/0066121 A1* | 3/2010 | Gross | G10K 11/162 442/364 |
| 2011/0293911 A1 | 12/2011 | Coates et al. | |
| 2013/0316102 A1 | 11/2013 | Yoshida | |
| 2015/0231946 A1 | 8/2015 | Bianchi | |
| 2015/0273739 A1* | 10/2015 | Leuciuc | B60R 13/0861 264/46.4 |
| 2015/0330001 A1* | 11/2015 | Coates | D04H 1/732 264/103 |
| 2017/0088750 A1* | 3/2017 | Bush | B32B 29/00 |
| 2017/0122466 A1 | 5/2017 | Sakakibara et al. | |
| 2017/0309266 A1* | 10/2017 | Akasaka | G10K 11/16 |
| 2020/0230909 A1* | 7/2020 | Volkmann | B32B 27/36 |
| 2021/0293449 A1* | 9/2021 | Chaut | B32B 27/12 |

FOREIGN PATENT DOCUMENTS

| | | | | |
|---|---|---|---|---|
| CN | 103928022 A | 7/2014 | | |
| CN | 204020122 U | 12/2014 | | |
| CN | 104553174 A | 4/2015 | | |
| CN | 104723983 A | 6/2015 | | |
| CN | 105144284 A | 12/2015 | | |
| CN | 105855264 A | 8/2016 | | |
| CN | 106739226 A | 5/2017 | | |
| CN | 107454872 A | 12/2017 | | |
| CN | 107696649 A | 2/2018 | | |
| DE | 10261081 B3 | 2/2004 | | |
| DE | 102007060525 A1 | 6/2009 | | |
| DE | 102011008518 A1 | 7/2012 | | |
| DE | 102011076129 A1 | * | 11/2012 | ........ B29C 45/14598 |
| DE | 112012005205 T5 | 9/2014 | | |
| EP | 1495885 B2 | 1/2005 | | |
| EP | 1741538 B1 | 1/2007 | | |
| EP | 2236286 A1 | 10/2010 | | |
| EP | 1930192 B1 | 11/2010 | | |
| EP | 2962875 B1 | 1/2016 | | |
| FR | 3027817 A1 | 5/2016 | | |
| JP | H06-156054 A | 6/1994 | | |
| JP | 2002-122289 A | 4/2002 | | |
| JP | 2008-089272 A | 4/2008 | | |
| JP | 2008281276 A | * | 11/2008 | |
| JP | 4359444 B2 | 11/2009 | | |
| JP | 2015-102593 A | 6/2015 | | |
| RU | 2117792 C1 | 8/1998 | | |
| WO | 2005/081226 A1 | 9/2005 | | |
| WO | 2014/089251 A1 | 6/2014 | | |
| WO | 2016/118587 A1 | 7/2016 | | |
| WO | 2016/160264 A1 | 10/2016 | | |
| WO | WO-2016187526 A1 | * | 11/2016 | ............ B32B 15/00 |

OTHER PUBLICATIONS

Espacenet Translation of DE-102011076129-A1 (Year: 2022).*
ip.com translation of JP-2008281276-A (Year: 2023).*
International Search Report and Written Opinion for International Application PCT/US2019/045191, dated Nov. 7, 2019.
Chinese Office Action, dated Feb. 22, 2022, for Chinese patent application No. 201980049421.4.
Chinese Office Action, dated Jan. 26, 2022, for Chinese patent application No. 201980065567.8.
Chinese Second Office Action dated Sep. 22, 2022, for Chinese Application 201980049421.4.
*Building Materials*, edited by Xianbin Meng, pp. 146-152, Northwestern Polytechnical University Press, Dec. 1989.
Chinese Notification of Rejection dated May 30, 2023, for Chinese Patent Application No. 201980065567.8.
Third Communication pursuant to Art. 94(3) EPC dated Mar. 1, 2023, for European patent application No. 19165568.7.

* cited by examiner

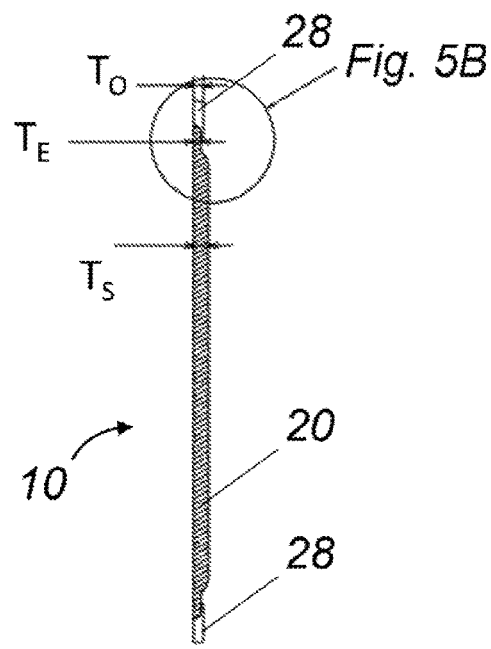
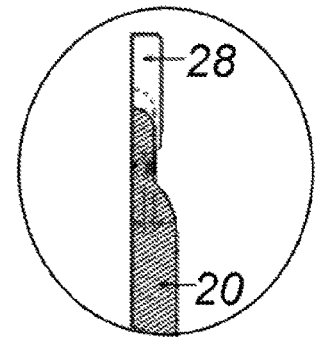
FIG. 5A
FIG. 5B
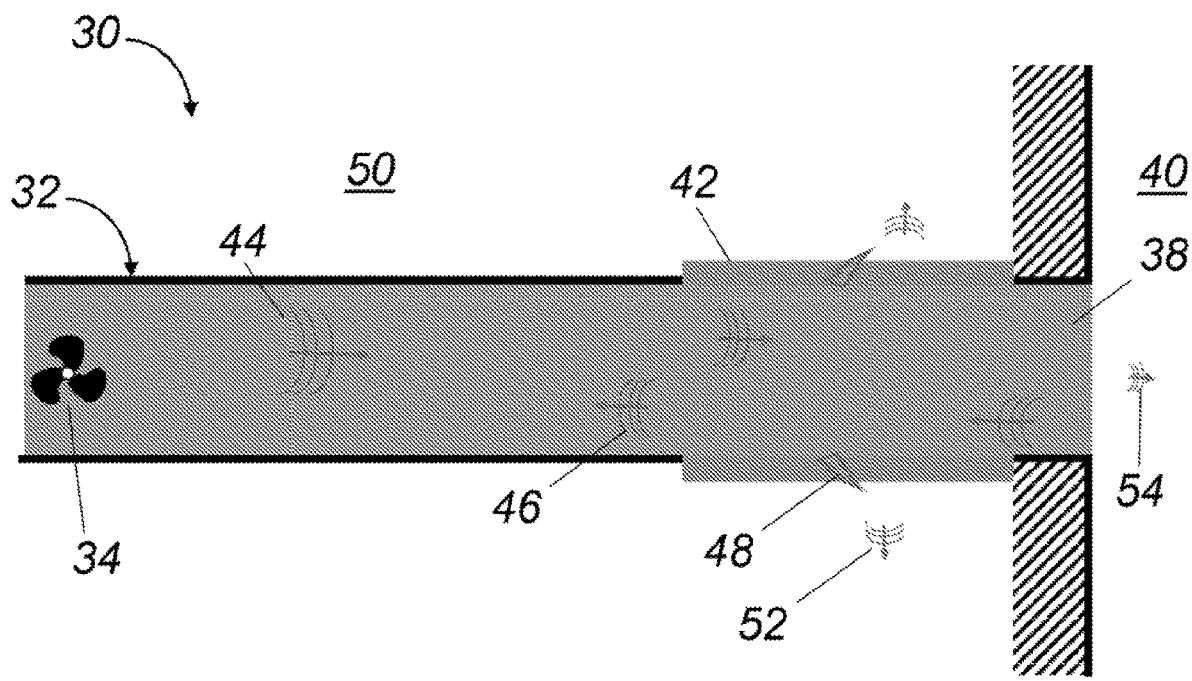
FIG. 6

NONWOVEN COMPOSITE FOR AIR FLOW APPLICATIONS

FIELD

The present teachings relate generally to a composite material, and more particularly, to a composite material that is light weight and that provides high acoustic performance.

BACKGROUND industry is constantly seeking new and/or improved materials and methods of providing sound and noise reduction in a variety of applications. Materials that exhibit sound absorption characteristics are often employed as a way to provide noise reduction in a wide range of industrial, commercial, and domestic applications. It is often desirable to reduce noises of machinery, engines, and the like. For example, in automotive applications, it may be undesirable for a passenger to hear noises coming from the air conditioning unit or from other places of the vehicle. Industry is also constantly seeking new methods and materials for lightweighting, such as for achieving better fuel efficiency and handling, without sacrificing the performance of the parts.

Air ducts, such as those within a vehicle, are commonly made of molded parts, such as by injection molding or by blow molding. However, injection molded parts can be heavy. In addition, these molded parts may not provide adequate sound absorption characteristics. As these rigid parts are connected within an assembly, such as by fasteners, rattling or squeaking noises may be heard as the parts rub against each other or vibrate (e.g., due to the air flowing through, due to the movement of the assembly, such as when driving a vehicle, or both).

Other air ducts are made of textile materials. However, these textile ducts experience air leakage through the material, which is disadvantageous, since the air is intended to be pumped to the area to be heated or cooled, not to escape before reaching the intended area. In air duct systems, it is important that the air traveling though the duct does not pass through the walls of the duct.

Therefore, there is a need for new and/or improved materials for reducing leakage of air, for providing sound absorption characteristics, for reducing rattling or squeaking within the assembly, for providing a lower weight material, for providing predictable material behavior, or a combination thereof. There is also a need for parts that are recyclable. Furthermore, it is desirable to provide parts that are easy to assemble and/or install into the desired application.

SUMMARY

The present teachings meet one or more of the above needs by the improved devices and methods described herein. The present teachings provide improved sound absorption by creating a multi-layer, composite material that allows for reduction of weight while still ensuring the geometrical stability; reduction of undesirable noises, such as those able to be heard by a vehicle occupant; reduction of air passing through the material; or a combination thereof. The composite material as described herein may also be formed into a sheet and then shaped to form a desired structure, such as to form an air duct or hushpanel. The composite material may also include one or more overmolded layers or features.

The present teachings include any of the following features in any combination. The present teachings envision a composite material. The composite material may include a plurality of discrete layers layered on top of each other. The layers may include one or more nonwoven layers (e.g., one or more needlepunched layers, one or more spun-bond layers, one or more melt-blown layers, one or more spun-laced layers, one or more air laid layers, or a combination thereof). The layers may include one or more fibrous material layers. The composite material may include one or more overmolded features from an injection molding process. One or more layers of the composite material may comprise one or more materials presenting an affinity with the overmolding material. The composite material may comprise polyethylene terephthalate, polypropylene, or both. One or both of these materials may present an affinity with the overmolding material. The composite material may include a fibrous material layer sandwiched between two nonwoven layers (e.g., needlepunched layers, spun-bond layers, melt-blown layers, spun-laced layers, air-laid layers, or a combination thereof). The composite material may include one or more film, foil, or facing layers. The composite material may include a fibrous layer sandwiched between a nonwoven layer and a film, foil, or facing layer. One or more of the nonwoven layers (e.g., needlepunched layers, spun-bond layers, melt-blown layers, spun-laced layers, air-laid layers, or a combination thereof) may have a weight of about 10 grams per square meter or more, about 50 grams per square meter or more, about 75 grams per square meter or more, about 100 grams per square meter or more, about 300 grams per square meter or less, or a combination thereof. The composite material may be thermoformable. The composite material may be molded into a three-dimensional part. One or more of the fibrous material layers may have an average fiber length of about 12 mm or less, about 6 mm or less, about 4 mm or less, about 3 mm or less, or about 2 mm or less. One or more of the fibrous nonwoven material layers may be formed from a lapping process and may optionally be compressed. One or more of the fibrous nonwoven material layers may be created from a blend of polyolefin and polyester based fibers. Each layer of the composite material may have a specific air flow resistance that is different from a layer directly adjacent. The overmolded feature may be a fastener, a layer, one or more ribs, a loudspeaker grid, and the like. The composite material as described herein and the methods of forming the material may allow for accurate geometry that cannot be achieved with thermoforming. The composite material may exhibit acoustic absorption characteristics and/or acoustic insertion loss characteristics. The composite material may have a porosity of about 55 percent or greater, about 80 percent or less, or both, prior to thermocompression (e.g., about 59% to about 77%, where the percentage is the volume of the material that is air), to facilitate overmolding. The composite material may be shaped to form an air duct or hushpanel. The air duct or hushpanel may be a hybrid part having one or more areas with a non-permeable film, foil, or facing, and one or more areas free of the non-permeable film, foil, or facing.

The present teachings also contemplate a method of forming the composite material. The method may include forming a sheet of material comprising one or more needlepunched layers, one or more spun-bond layers, one or more met-blown layers, one or more spun-laced layers, one or more air-laid layers, or a combination thereof, and one or more fibrous nonwoven material layers. The sheet may be thermoformed to form a three-dimensional structure. The sheet or the three-dimensional structure may be overmolded (e.g., with one or more features, such as a layer, fastener, rib, or other feature). The sheet of material may be formed by thermally activating the layers (e.g., in an air-circulating oven, contact heating system, or infrared heating system) and compressing to a desired thickness. The method may also include a step of trimming excess material from the three-dimensional structure. The excess may be recyclable.

The resulting composite material meets the needs above, as it provides a lightweight material that exhibits good acoustic absorption properties while also facilitating simpler assembly. The composite material may be able to be thermoformed and overmolded, which may be due to the porosity of the material.

DESCRIPTION OF THE DRAWINGS

FIG. 5A is a cross-sectional view of the composite material of FIG. 3 taken along line A-A.

FIG. 5B is an enlarged view of the circled portion of FIG. 5A.

FIG. 6 is an exemplary vehicle assembly including an air duct formed from the composite material of the present teachings.

DETAILED DESCRIPTION

Figure 1:
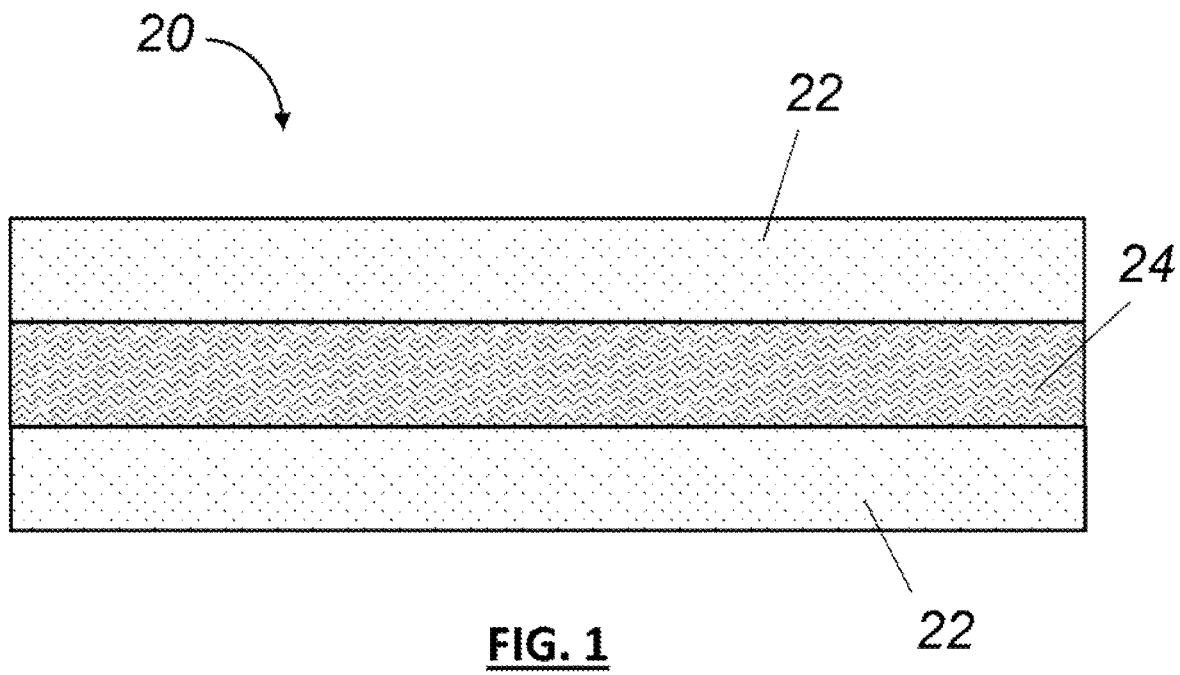
FIG. 1 is a cross-sectional view of a fibrous sheet of a composite material in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Composite materials, such as the materials as discussed herein, may have a wide range of applications, such as where sound absorption is desired. While discussed and illustrated herein as useful in air ducts, other uses are contemplated. These materials may also be employed where a reduction in air leakage through the material is desired. For example, and not to serve as limiting, acoustic materials may be used in automotive applications, generator set engine compartments, commercial vehicle engines, in-cab areas, architectural applications, and even heating, ventilating and air conditioning (HVAC) applications. The materials may be suitable for use in air ducts. The materials may be suitable for hushpanels. The materials may be suitable for use in an area where the fluid or gas flow is turbulent. The composite materials may be suitable for (but not limited to) use as sound attenuation materials in vehicles, attenuating sound originating from outside a cabin of a motor vehicle and propagating toward the inside of the cabin. The composite materials may be suitable for attenuating sound within or surrounding an air duct. The composite materials may provide sound absorption so that air flowing through the air duct is inaudible or less audible than if flowing through another medium. The composite materials may be used for machinery and equipment insulation, motor vehicle insulation, domestic appliance insulation, dishwashers, and commercial wall and ceiling panels. Composite materials may be used in the engine cavity of a vehicle, on the inner and outer dash panels and under the carpeting in the cabin, for example. Composite materials may be used inside cabs to provide acoustic absorption. Composite materials may be used in any application where a lighter weight acoustic material is desired. Composite materials may be used as interior decorative trim, in which case it may be necessary to face the acoustic sheet with some form of decorative fabric or other covering. The acoustic sheets may be used in combination with other sound absorption materials. Composite materials may also be useful as an acoustic pin board material or as a ceiling tile.

Composite products, such as composite acoustic materials, may be formed, at least in part, from porous limp sheets with relatively high air flow resistances, porous bulk absorbers or spacer materials having air flow resistances substantially smaller than the limp sheets, or both. Composite products, or layers thereof, include those set out in co-owned U.S. Publication No. 2011/0293911, entitled "Nonwoven Textile Made from Short Fibers", the contents of which are hereby incorporated by reference. Methods for producing such composite products include those set out in co-owned International Application No. PCT/AU2005/000239 entitled "Thermoformable Acoustic Product" (published as WO/2005/08122), the contents of which are hereby incorporated herein by reference.

In general, materials used for sound absorption (e.g., composite acoustic materials, nonwoven materials, woven materials, the like, or combination thereof) must exhibit air permeability properties. Critical characteristics include air flow resistance (resistance to air flow through the material), tortuosity (the path length of a sound wave within the material), and porosity (void to volume ratio). With fibrous materials, air flow resistance is an important factor controlling sound absorption. However, it is contemplated that the layers of the composite material as disclosed herein have different air permeability properties. For example, one or more layers may allow air to pass through the materials or pores of the materials. One or more layers may have a different porosity from another layer in the composite material. One or more layers may inhibit air from passing through the material. This may allow to sound absorption without allowing the air to escape through the material. The resulting structure may be a non-permeable composite material, where non-permeable is understood to mean that about 10 percent or less, about 5 percent or less, or even about 1 percent or less of air contacting the material is permitted to pass through the entirety of the material. Non-permeable may be defined as no air being permitted to pass through the entirety of the material (i.e., through the entire thickness of the material). Non-permeability may also be defined in terms of pressure drop by measuring the pressure of the air on one side of the material and the pressure of air on the other side of the material (where the sides define the thickness of the material).

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The sound absorption coefficient (SAC) and sound transmission loss (STL) level of an air permeable or porous material may be improved and tuned by layering materials together. These layers may have different levels of specific air flow resistance. The building of these types of layers creates a multi-acoustic impedance mismatched profile throughout the thickness of the composite. This mismatched profile amplifies the noise reduction capability (both SAC and STL) of the composite. The mismatched profile may also permit air to pass through certain layers but not others (or may only permit some air to pass through certain layers but not all air) so that noise is reduced but the air, or some air, is retained within the structure. Surprisingly, the results are a noise reduction and/or sound absorption at a greater level than that of the summation of the performance of the individual layers as standalone units. Therefore, the layers of materials produce a generally synergistic effect to improve sound absorption performance.

By utilizing the synergistic performance of a multi-layered composite, mass of material in each layer may be reduced in comparison to traditional single or dual layered acoustic material (e.g., a non-faced or single low air flow resistance (AFR) faced open cell foam or a single-scrim low AFR faced fiber). Reducing the mass of fiber in the matrix forming one or more layers of the composite may reduce material cost and/or manufacturing costs, as lighter weight layers may be produced more quickly than a heavier weight layer.

The performance of the multi-layer systems may be about the same as or may even exceed that of traditional materials. However, multi-layer systems may allow for lower overall composite thickness than traditional materials. Multi-layer systems may also allow for lighter weight than traditional materials. The lower thickness of the multi-layer composite may allow for better fitment into packaging space constrained areas. Shipping improvements may be realized since more material can be shipped in a finite volume at equal or greater acoustic performance as compared to a heavier and/or thicker sound absorption product. The composite may function to absorb sound waves to reduce noise. The composite may include one or more layers, and preferably a plurality of layers. The layers may be of different materials. Some layers may be of the same materials. The type of materials forming the layers, order of the layers, number of layers, thickness of layers, or a combination thereof, may be chosen based on the air flow resistive properties of each material, the desired air flow resistive properties of the composite as a whole, the desired weight, density and/or thickness of the composite (e.g., based upon the space available in the vehicle where the composite will be installed), desired stiffness of the material, desired structural properties, desired insulative properties, ability to withstand particular temperatures, or a combination thereof. For example, some layers may have a lower air flow resistance while other layers may have a higher air flow resistance. The layering of layers having different air flow resistive properties may produce a multi-impedance acoustic mismatched profile through the entire acoustic composite, which provides improved noise reduction capability of the composite. Therefore, the layers may be arranged so that a layer of higher specific air flow resistance is joined to or is adjacent to one or more layers of a different specific air flow resistance (e.g., a lower air flow resistance).

Any of the materials described herein may serve as one or more layers of the composite. Any of the materials described herein may be combined with other materials described herein (e.g., in the same layer or in different layers of the composite). The composite may include a plurality of layers, some or all of which serve different functions or provide different properties to the composite (when compared to other layers of the composite). The ability to combine layers of materials having different properties may allow the composite to be customized based on the application. For example, one or more layers may provide structural properties to the composite or structure formed therefrom. One or more layers may provide air flow resistive properties to the composite or structure formed therefrom. One or more layers may provide non-permeable characteristics to the composite or structure formed therefrom. One or more layers may provide insulation. One or more layers may provide temperature resistance (e.g., may be able to withstand elevated temperatures, such as those about 150° C. or higher, about 200° C. or higher, about 300° C. or lower, about 250° C. or lower, or a combination thereof). One or more composite layers may include one or more adhesive materials (e.g., as part of the fibers of the layer or as a separate element in or on the layer) for binding the fibers together, for binding layers together, for binding structures formed from the composite material together, or a combination thereof. One or more composite layers may support a facing material or top layer, such as a foil or film layer. One or more composite layers may provide heat resistance (e.g., if the composite is located in an area that is exposed to high temperatures). One or more composite layers may provide stiffness to the composite. One or more composite layers may provide flexibility and/or softness to the composite material. One or more composite layers may extend over the entirety of another layer. One or more composite layers may extend over only a portion of another layer (e.g., acting as a patch or to provide desired properties or reinforcement in a specific location). One or more composite layers may attach directly to a wall or surface of a substrate to provide acoustic absorption. One or more composite layers may be any material known to exhibit sound absorption characteristics. One or more composite layers may be at least partially formed from fibrous material. One or more composite layers may be at least partially formed as a web of material (e.g., a fibrous web). One or more composite layers may be formed from nonwoven material, such as short fiber nonwoven materials. One or more composite layers may be a film or foil, such as a thermoformable film or foil. One or more composite layers may be a porous bulk absorber (e.g., a lofted porous bulk absorber formed by a carding and/or lapping process). One or more composite layers may be formed by air laying. One or more layers may be a nonwoven layer. The nonwoven layer may be a needlepunched material, a spun-bond material, a melt-blown material, a spun-laced material, an air-laid material, or a combination thereof. One or more layers or one or more components of the composite material may be formed by injection molding. The injection molded part or layer may be adhered or fastened, for example, to the composite material. The composite (or one or more of the composite layers) may be an engineered 3D structure. It is clear from these potential layers that there is great flexibility in creating an acoustic material that meets the specific needs of an end user, customer, installer, and the like. The combination of any of these layers and properties is contemplated to be within the scope of the teachings herein.

One or more layers of the composite material may have a relatively high air flow resistance to present acoustic impedance to the sound pressure wave incident upon the material. Air permeability should be managed to ensure predictable and consistent performance. This may be achieved through management of fiber sizes, types, and lengths, among other factors, in some applications, desirable levels of air permeability may be achieved by combining plural nonwoven materials of differing densities together to form a composite product. A combination of materials having low permeability, or even substantially no permeability, with those having high permeability can be used to achieve locally reactive acoustic behavior. The composite material of the present teachings contemplates one or more nonwoven layers (e.g., one or more needlepunched layers, one or more spun-bond layers, one or more melt-blown layers, one or more spun-lace layers, or a combination thereof); one or more film or foil layers; one or more core material layers; one or more nonwoven material layers; or a combination thereof.

The composite material may include one or more fibrous layers, which may be referred to herein as a core layer, a fibrous sheet, a nonwoven layer, or a combination thereof. Where one of these terms is used, it is intended to refer to any of these terms. While referred to herein separately, one or more nonwoven layers (e.g., one or more needlepunched layers, one or more spun-bond layers, one or more melt-blown layers, one or more spun-laced layers, one or more air-laid layers, or a combination thereof) may also be formed of the fibers disclosed herein. The fibers that make up one or more layers of the composite material may have a linear mass density from about 0.25 denier or greater, about 0.5 denier or greater, or about 1 denier or greater. The material fibers that make up the composite material or one or more layers thereof may be about 150 denier or less, about 120 denier or less, or about 100 denier or less. Certain layers may have an average denier that is higher than other layers. The average denier may depend upon the fibers used. For example, a layer having natural fibers may have an average denier of about 100 denier t about 20 denier. The fibers may have a staple length of about 0.5 mm or greater, about 1.5 millimeters or greater, or even about 70 millimeters or greater (e.g., for carded fibrous webs). Fibers within the layer may have a length of about 300 millimeters or less, about 250 millimeters or less, or about 200 millimeters or less. For example, the length of the fibers may be between about 30 millimeters and about 65 millimeters, with an average or common length of about 50 or 51 millimeters staple length, or any length typical of those used in fiber carding processes. Fiber lengths may vary within a layer. For example, a core layer may have fibers ranging from about 1 mm or about 120 mm. The length of the fibers used may depend on the processing to form the layer. For example, a carded and/or needle punched layer may require fibers of a certain length (e.g., at least some of the fibers having a length of about 30 mm or longer).

Short fibers may be used. For example, some or all of the fibers may be a powder-like consistency (e.g., with a fiber length of about 0.25 mm or more, about 0.5 mm or more, or about 1 mm or more; about 5 mm or less, about 4 mm or less, or about 3 mm or less). Fibers of differing lengths may be combined to form a fibrous layer or other layer of the fibrous structure. The fiber length may vary depending on the application, the properties desired, dimensions and/or properties of the material (e.g., density, porosity, desired air flow resistance, thickness, size, shape, and the like of the layer), or any combination thereof. Again, more effective packing of the shorter fibers may allow pore size to be more readily controlled in order to achieve desirable acoustic characteristics, air flow characteristics, or both. In some applications, the use of shorter fibers, or the use of a combination of fibers, may have advantages for forming a material that exhibits acoustic absorption properties. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The fibrous layer may include natural or synthetic fibers. The fibrous layer may include inorganic fibers. Suitable fibers may include cotton, jute, wool, cellulose, glass, silica-based, ceramic fibers, or any combination thereof. Suitable synthetic fibers may include polyester, polypropylene, polyethylene, Nylon, aramid, imide, acrylate fibers, or combination thereof. The fibrous layer material may comprise polyester fibers, such as polybutylene terephthalate (PBT), polyethylene terephthalate (PET), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyethersulfone (PES), or other polymeric fibers. The fibers may be selected for their melting and/or softening temperatures. The fibers may be 100% virgin fibers, or may contain fibers regenerated from postconsumer waste (for example, up to about 90% fibers regenerated from postconsumer waste or even up to 100% fibers regenerated from postconsumer waste).

One or more fibrous sheet (or any other layer of the fibrous structure) may include a binder or binder fibers. Binder may be present in the fibrous layer in an amount of about 40 percent by weight or less, about 30 percent by weight or less, about 25 percent by weight or less, or about 15 percent by weight or less. The binder may be present in an amount of about 1 percent by weight or greater, about 3 percent by weight or greater, or about 5 percent by weight or greater. The fibrous layer may be substantially free of binder. The fibrous layer may be entirely free of binder. While referred to herein as fibers, it is also contemplated that the binder could be generally powder-like (e.g., with a fiber length of about 3 millimeters or less, or about 2 millimeters or less, or even smaller, such as about 20 microns or greater, about 40 microns or greater, about 100 microns or greater, about 200 microns or greater, or about 500 microns or greater), spherical, or any shape capable of being received within interstitial spaces between other fibers and capable of binding the fibrous layer together. The binder may have a softening and/or melting temperature of about 180° C. or greater, about 200° C. or greater, about 225° C. or greater, about 230° C. or greater, or even about 250° C. or greater. The fibers may be high-temperature thermoplastic materials. The fibers may include one or more of polyamideimide (PAI); high-performance polyamide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polybutylene terephthalate (PBT); polyphenylene sulfide; syndiotactic polystyrene; polyetherether ketone (PEEK); polyphenylene sulfide (PPS), silica-based binder systems; and the like. The fibrous layer may include polyacrylate and/or epoxy (e.g., thermoset and/or thermoplastic type) fibers. The fibrous layer may include a multi-binder system. The fibrous layer may include one or more sacrificial binder materials and/or binder materials having a lower melting temperature than other fibers. The fibrous layer may include binder materials that are formulated to achieve or impact desired characteristics, such as flame retardance or super absorbance.

The fibrous layer (or any other layer of the fibrous structure) may include a plurality of bi-component fibers. The bi-component fibers may act as a binder within the fibrous layer. The bi-component fibers may be a thermoplastic lower melt bi-component fiber. The bi-component fibers may have a lower melting temperature than the other fibers within the mixture. The bi-component fiber may be of a flame retardant type (e.g., formed from or inducing flame retardant polyester). The bi-component fibers may enable the fibrous layer to be air laid or mechanically carded, lapped, and fused in space as a network so that the material may have structure and body and can be handled, laminated, fabricated, installed as a cut or molded part, or the like to provide insulation properties, acoustic absorption, structural properties, filtration properties, fire retardant properties, smoke retardant properties, low toxicity, or a combination thereof. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous layer (or other layer of the fibrous structure) is heated to soften the sheath material of the bi-component may depend upon the physical properties of the sheath material. Some fibers or parts of the fibers (e.g., the sheath) may be crystalline, or partially crystalline. Some fibers or parts of the fibers (e.g., the sheath) may be amorphous.

For a polyethylene or polypropylene sheath, for example, the temperature may be about 140 degrees C. or greater, about 150 degrees C. or greater, or about 160 degrees C. or greater. The temperature may be about 220 degrees C. or less, about 210 degrees C. or less, or about 200 degrees C. or less. Bi-component fibers having a polyethylene terephthalate (PET) sheath or a polybutylene terephthalate (PBT) sheath, for example, may melt at about 180 degrees C. to about 240 degrees C. (e.g., about 230 degrees C.). The bi-component fibers may be formed of short lengths chopped from extruded bi-component fibers. The bi-component fibers may have a sheath-to-core ratio (in cross-sectional area) of about 15% or more, about 20% or more, or about 25% or more. The bi-component fibers may have a sheath-to-core ratio of about 50% or less, about 40% or less, or about 35% or less.

The fibers may have or may provide improved thermal insulation properties. The fibers may have relatively low thermal conductivity. The fibers may have geometries that are non-circular or non-cylindrical (e.g., to alter convective flows around the fiber to reduce convective heat transfer effects within the three-dimensional structure). The fibrous layer may include or contain engineered aerogel structures to impart additional thermal insulating benefits. The fibrous layer may include or be enriched with pyrolized organic bamboo additives. Some fibers may be sacrificial upon exposure to certain temperatures. For example, if the fibrous layer is exposed to a temperature of about 250° C. or greater, some of the fibers may volatilize away.

The fibers forming the fibrous layer include an inorganic material. The inorganic material may be any material capable of withstanding temperatures of about 250° C. or greater, about 500° C. or greater, about 750° C. or greater, about 1000° C. or greater. The inorganic material may be a material capable of withstanding temperatures up to about 1200° C. (e.g., up to about 1150° C.). The inorganic fibers may have a limiting oxygen index (LOI) via ASTM D2836 or ISO 4589-2 for example that is indicative of low flame or smoke. The LO of the inorganic fibers may be higher than the LOI of standard binder fibers. For example, the LOI of standard PET bicomponent fibers may be about 20 to about 23. Therefore, the LOI of the inorganic fibers may be about 23 or greater. For example, the LOI may be about 100. The inorganic fibers may have an LOI that is about 25 or greater. The inorganic fibers may be present in the fibrous layer in an amount of about 60 percent by weight or greater, about 70 percent by weight or greater, about 80 percent by weight or greater, or about 90 percent by weight or greater. The inorganic fibers may be present in the fibrous layer in an amount of about 100 percent by weight or less. The inorganic fibers may be selected based on a desired stiffness. The inorganic fibers may be crimped, non-crimped, or a combination thereof. Non-crimped organic fibers may be used when a fiber with a larger bending modulus (or higher stiffness) is desired. The modulus of the inorganic fiber may determine the size of the loops when the lapped fibrous structure is formed. Where a fiber is needed to bend more easily, a crimped fiber may be used. The inorganic fibers may be ceramic fibers, glass fibers, mineral-based fibers, or a combination thereof. Ceramic fibers may be formed from polysilicic acid (e.g., Sialoxol or Sialoxid), or derivatives of such. For example, the inorganic fibers may be based on an amorphous aluminum oxide containing polysilicic acid. Siloxane, silane, and/or silanol may be added or reacted into the fibrous layer to impart additional functionality. These modifiers could include carbon-containing components.

Any inorganic fibers of the fibrous layer may have an average linear mass density of about 0.4 denier or greater, about 0.6 denier or greater, or about 0.8 denier or greater. The inorganic fibers of the fibrous layer may have an average linear mass density of about 2.0 denier or less, about 1.7 denier or less, or about 1.5 denier or less. Other fibers of the fibrous layer (e.g., bicomponent binder) may have an average linear mass density of about 1 denier or greater, about 1.5 denier or greater, or about 2 denier or greater. Other fibers of the fibrous layer (e.g., bicomponent binder) may have an average linear mass density of about 20 denier or less, about 17 denier or less, or about 15 denier or less. The inorganic fibers of the fibrous layer may have a length of about 20 mm or greater, about 27 mm or greater, or about 34 mm or greater. The inorganic fibers of the fibrous layer may have a length of about 200 mm or less, about 150 mm or less, or about 130 mm or less. A combination of fibers having varying lengths may be used. For example, a combination of about 67 mm and about 100 mm lengths may be used. Varying lengths may be advantageous in some instances, as there may be natural cohesion of the fibers due to the length difference of the fibers, the type of fibers, or both. The blend of fibers of the fibrous layer may have an average denier size of about 1 denier or greater, about 5 denier or greater, or about 6 denier or greater. The blend of fibers of the fibrous layer may have an average denier size of about 10 denier or less, about 8 denier or less, or about 7 denier or less. For example, the average denier size may be about 6.9 denier.

The fibers, or at least a portion of the fibers, may have high infrared reflectance or low emissivity. At least some of the fibers may be metallized to provide infrared (IR) radiant heat reflection. To provide heat reflective properties to and/or protect the fibrous layer, the fibers may be metalized. For example, fibers may be aluminized. The fibers themselves may be infrared reflective (e.g., so that an additional metallization or aluminization step may not be necessary). Metallization or aluminization processes can be performed by depositing metal atoms onto the fibers. As an example, aluminization may be established by applying a layer of aluminum atoms to the surface of fibers. Metalizing may be performed prior to the application of any additional layers to the fibrous layer. It is contemplated that other layers of the fibrous structure may include metallized fibers in addition to, or instead of, having metallized fibers within the fibrous layer.

The metallization may provide a desired reflectivity or emissivity. The metallized fibers may be about 50% IR reflective or more, about 85% IR reflective or more, or about 80% IR reflective or more. The metallized fibers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application.

Other coatings may be applied to the fibers, metallized or not, to achieve desired properties. Oleophobic and/or hydrophobic treatments may be added. Flame retardants may be added. A corrosion resistant coating may be applied to the metalized fibers to reduce or protect the metal (e.g., aluminum) from oxidizing and/or losing reflectivity. IR reflective coatings not based on metallization technology may be added.

The fibers of the fibrous layer may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in the matrix could be of the low flame and/or smoke emitting type (e.g., for compliance with flame and smoke standards for transportation). Powders or liquids may be incorporated into the matrix that impart additional properties, such as binding, fire/smoke retarding intumescent, expanding polymers that work under heat, induction or radiation, which improves acoustic, physical, thermal, and fire properties. For example, active carbon powder may be incorporated into the fibrous layer, one or more nonwoven layers, or both.

The composite material may include one or more layers that are air permeable, such as one or more needlepunched layers, one or more spun-bond layers, one or more melt-blown layers, one or more spun-laced layers, one or more air-laid layers, or a combination thereof. These layers may be referred to herein as a nonwoven layer. The air-permeable layer may be a layer adapted to face the source of air flow or to directly contact a stream of air, thereby allowing the air to travel into other layers of the composite (e.g., the core or fibrous layer). The layer may, for example, define a cavity of an air duct. The layer may be a flexible material, which may provide flexibility to the composite material.

The air-permeable layer may be formed from a nonwoven material. The layer may be formed from a textile material. The layer may be formed by needle-punching, alone or in combination with any of the methods of forming layers described herein or known in the art. The layer may be compressed using one or more methods, such as with a press, laminator, set of calender rolls, or the like. The layer may be compressed and melted in a thermoforming step. The layer may be formed using any nonwoven technologies. For example, the layer may be spun bound, melt blown, cross-laid, compressed air laid, SMS, spunlaced, direct laid, wet laid, dry laid, the like, or a combination thereof. The layer may be formed from any fibers capable of being mechanically or thermally bonded to each other.

The air-permeable (e.g., needlepunched) layers may be formed of any of the fibers discussed above with respect to the fibrous layer. One or more air-permeable layers may be adapted to face a source of sound waves. One or more air-permeable layers may be adapted to face away from a source of sound. One or more air-permeable layers may be adjacent to one or more fibrous layers. One or more air-permeable layers may be secured to a surface of one or more fibrous layers. Two or more air-permeable layers may sandwich a fibrous layer in forming the composite material. The air-permeable layers may be the same composition and/or structure. The air-permeable layers may be of different compositions and/or structures. The one or more air-permeable layers may have a weight of about 10 grams per square meter (GSM) or more; about 50 GSM or more, about 75 GSM or more, about 100 GSM or more; or about 200 GSM or more. The one or more air-permeable layers may have a weight of about 500 GSM or less, about 400 GSM or less, or about 300 GSM or less. The weight may be dependent upon the material forming the air-permeable layer. For example, a needlepunched layer may be about 75 GMS or greater. A spun-bond layer may have a weight of about 20 GSM or less.

One or more layers of the composite may be a film, foil, or facing laminate. One or more layers of the composite may have a film, foil, or facing attached to at least a portion of the layer. While referred to herein as a film, foil, or facing layer, this also encompasses films, foils, or facings that do not cover the entirety of another layer. For example, a part may be a hybrid part including some areas with a film, foil, or facing, and some areas that are free of a film, foil, or facing. It is also contemplated that the composite may be free of any film, foil, or facing. The film, foil, or facing layer may function as a non-permeable layer so that air is substantially prevented from passing through the layer (i.e., so that about 10% or less, about 5% or less, or about 1% or less of all air passes through the layer). The film, foil, or facing layer may include perforations, holes, voids, or other openings to allow for air and/or sound waves to travel therethrough. The composite may include areas that are free of the film, foil, or facing to control where air and/or sound waves are permitted to travel. The layer may provide protective properties to the composite material. The material(s) forming the layer may provide thermoformable properties to the layer, or to the composite material as a whole, so that the composite material may be shaped into a three-dimensional structure, for example. The layer may be a generally solid layer. The layer may be formed from one or more layers, or a plurality of layers.

The film, foil, or facing laminate may be impermeable. In such a case, the air flow resistance would be infinite, or near infinite. As air flow resistance is proportional to the inverse of the air permeability. As air permeability may be 0, or about 0, for a non-permeable material, the air flow resistance would then be infinite. Air permeability of the film, foil, or facing layer, may be about 0 $l/m^2/s$ or more, about 50 $l/m^2/s$ or more, or about 100 $l/m^2/s$ or more at 200 Pa. Air permeability of the film, foil, or facing layer, may be about 400 $l/m^2/s$ or less, about 300 $l/m^2/s$ or less, or about 250 $l/m^2/s$ or less at 200 Pa.

The film, foil, or facing laminate may be applied to another composite layer, which may act as a facing. The film may be any polymeric film, for example a polyester (e.g., PET) film, a polyurethane film, or both. While referred to as a layer, the film, foil, or facing laminate itself may be formed from one or more layers. The non-permeability of the layer may be achieved through a mufti-layer film, such as a film formed from thermoplastic polyurethane and thermoplastic polyester elastomer-based layers. For example, the film, foil or facing laminate may include 1 or more layers, 2 or more layers, or 3 or more layers. The film, foil, or facing laminate may include 15 or fewer layers, 12 or fewer layers, or 10 or fewer layers. The foil or film layer may exhibit high thermal barrier properties and may remain stable at extreme temperatures. Exemplary film layers include APT 9924, available from Advance Packaging Technologies (Waterford, Michigan); or TC 4070 CX 20 B/A, available from Prochimir Technical Films (Pouzauges, France).

The film may be a reflective film. The facing laminate may be a foil (e.g., a reinforced foil, a metallic foil, or both). The foil may be laminated to another composite layer. For example, the foil may be a laminated reinforced aluminum foil. The layer may be applied over other layers of the composite to provide localized heat reflection without considerably sacrificing the properties of the underneath composite material and without reducing the acoustic absorption capacity of the existing base material (the one or more composite layers). For an outermost layer of the acoustic composite, to provide heat reflective properties and protect the composite layers underneath, the outermost layer may be metalized or aluminized. The outermost layer itself may be metallic (e.g., so that an additional metallization or aluminization step may not be necessary).

The composite may include an optional additional air permeable layer located between the film, foil, or facing layer and the core material layer. The layer may enhance the acoustic impedance mismatch, between the layers especially when positioned between the core material and the film, foil or facing material. As the layer is permeable, it may also act similarly to an air gap between the film, foil or facing material and the core material layer to further enhance acoustic absorption, as sound waves are permitted to pass through the inner air permeable material, core material layer and optional additional air permeable layer and reflect off of the film, foil, or facing material and back into the optional air permeable layer and core material layer (and any additional layers).

The composite material may include one or more overmolded areas, layers, or features, also referred to herein as the overmolded portion. The overmold material may cover all or a portion of another layer of the composite material. The overmold portion may be bonded to the composite material through an injection molding process. The overmolded portion may provide additional structure and/or reinforcement to the composite material. The overmolded portion may allow for integration of other features to the composite material, such as fasteners, clips, ribs, other structural elements, or features that cannot be created using traditional thermoforming techniques (e.g., a loudspeaker grid). The material bond between the overmold and the composite material may be the fastening itself. This may be an irreversible bond. Use of overmolding processes may allow for adding functions to the part or composite material, such as clips, grids, fasteners, and the like. Overmolding may reinforce the part or composite material, such as through the addition of ribs. Overmolding may provide or ensure dimensional tolerances that cannot be achieved through thermoforming. This may allow for easier, more secure, or more precise connections to other parts in the system, or geometrically accurate joint areas. Geometrically accurate joint areas are areas of connection or that contact other parts when in assembly, where the parts fit together (e.g., male and female members), such as in a geometrically complementary fashion. The overmolded portion may be formed from any material used in a plastic injection process. The overmolded portion may be formed from a polymeric material, such as, but not limited to, Nylon 6, with or without glass fibers; Nylon 6.6, with or without glass fibers; polypropylene; polyethylene terephthalate; polycarbonate; acrylonitrile butadiene styrene; or a combination thereof. The composite material is able to be overmolded, as it may have a higher AFR and/or higher open porosity as compared to a needlepunched material only. The overmolded material may adhere to another layer of the composite material through penetration into pores of the composite material or holes (which may be added manually or mechanically) formed in the composite material. The overmolded material will form a strong bond with the one or more layers to which it is molded, and this bond will be maintained in the end-use environment for the composite material. The layer of the component that is in contact with the overmold may, for example, be a needle punched layer. The layer of the component that is in contact with the overmold may comprise one or more materials having an affinity with the overmolding material. The materials may include polymeric materials. For example, the layer of the component in contact with the overmold may comprise polyethylene and/or polyethylene terephthalate.

Overmolding may be used to connect the composite material to another component. Overmolding may be used to integrate the composite material into another structure, such as a hollow structure (e.g., a duct). For example, the composite material may bridge a gap between two ends of a material (e.g., a C-shaped structure) or may join two pieces of material. Bridging this gap may then create a generally hollow structure (e.g., tuning a C-shaped structure into an O-shaped structure).

The overmold material and the composite material may form an adhesive bond. The overmold material may penetrate the porous material of the composite material and solidify there, creating a material bond between the composite material and the overmold material. This connection may reduce or eliminate rattling between components of a material. The overmold area may extend around the entire outer perimeter of the composite material.

During the overmolding process, it is contemplated that only part of the composite material may come into contact with the overmolding material. This may be due to covering one or more parts of the composite material in the mold die.

Each composite layer may be formed to have a thickness and density selected according to the required physical and air permeability properties desired of the finished composite layer (and/or the composite material as a whole). The composite layer may be any thickness depending on the application, location of installation, shape, fibers used (and the lofting of the composite layer), or other factors. The density of the composite layer may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers. The total thickness of the composite material may depend upon the number and thickness of the individual layers. The composite material is beneficial, as the thickness and properties can be tuned to have the desired weight, thickness, and acoustic and/or structural properties. The composite material can be customized. Customizations include the number of layers, types of layers, and compression of layers.

Considering the types of layers that may be used as described herein, the multi-layered system may vary the specific air flow resistances between the layers of the composite material to enhance sound absorption, reduce air leakage from the composite material, or both. The multi-layered system may have a top or outer layer (e.g., foil or film layer), and one or more layers below the top layer (e.g., one or more fibrous layers, such as a core layer, an air permeable layer, such as a flexible textile nonwoven material, or both). The top or outer layer of the composite may be a layer having a high air flow resistance, or may be substantially non-permeable. For example, the top or outer layer may have an air permeability of about 0 $l/m^2/s$ to about 250 $l/m^2/s$ at 200 Pa. The top or outer layer may be a film, facing laminate, or foil.

The composite material having multiple layers may have a high air flow resistivity. For example, one or more layers of the composite material, or the composite material as a whole, may have an air flow resistivity of about 100 Rayls/m or more, about 400 Rayls/m or more, about 800 Rayls/m or more, or about 1000 Rayls/m or more. The fibrous composite material may have an air flow resistivity of about 200,000 Rayls/m or less, about 150,000 Rayls/m or less, or about 100,000 Rayls/m or less. Low density fibrous composite materials may even have an air flow resistivity of up to about 275,000 Rayls/m. One or more layers of the composite material, or the composite material as a whole, may have an air flow resistivity of about 100.000 Rayls/m or higher, about 275,000 Rayls/m or higher, 1,000,000 Rayls/m or higher, or even 2,000,000 Rayls/m or higher. Additional sound absorption may also be provided by a skin layer or other layer on a fibrous layer (e.g., by an in-situ skinning process), facing layer, one or more functional layers, or a combination thereof. A skin layer or other layer as described herein of the fibrous structure may provide additional air flow resistance (or air flow resistivity) to the fibrous structure. For example, the skin layer may have an air flow resistivity of about 100,000 Rayls/m or higher, about 275,000 Rayls/m or higher, 1,000,000 Rayls/m or higher, or even 2,000,000 Rayls/m or higher.

The composite material, or layers thereof, may have a high open porosity. The high open porosity may allow for the composite material, or one or more fibrous layers of the composite material, to be overmolded. A high open porosity indicates that a high fraction of the material volume is air. Open porosity means that the air cavities or channels trapped into the material are in communication with each other. Such open porosity may permit the overmolding or overinjection processes as described herein. The melted material is forced into the cavities or channels during injection and upon cooling, the material is anchored within the porous material. This leaching of the material into other parts of the composite material may be controlled (e.g., prevented from filling all of the pores), so that other properties, such as acoustic absorption, are maintained. The porosity may be less than the porosity of a needlepunched layer alone, for example. For example, the composite material, or one or more layers thereof, may have a porosity of about 50 percent or greater, or about 55 percent or greater prior to thermocompression of the material. The composite material, or one or more layers thereof, may have a porosity of about 90 percent or less, or about 80 percent or less prior to thermocompression of the material. For example, porosity may be about 59 percent to about 77 percent, where the percentage is the volume of the material that is air.

The composite material, or layers thereof, may have sufficient rigidity that it maintains its desired shape. The composite material, or layers thereof, may be resistant to sagging (e.g., as compared to low density polyethylene or expanded polypropylene). The material may be shaped to fit within a desired location or to be installed in a particular application, and the material will maintain its shape, even in generally planar, unsupported, or cantilevered positions, for example.

The composite material may have one or more features for providing a composite material of a desired shape. The composite material, or one or more layers thereof, may include one or more locally weakening regions. The locally weakening regions may be located in one or more nonwoven layers of the composite material. These locally weakening regions may allow the composite material or one or more layers thereof to be folded to a desired shape (e.g., a three-dimensional shape). While referred to herein as weakening, it does not necessarily mean that the material is weak or compromised in these areas. Weakening refers to an area where the material is capable of bending and/or folding.

The composite material or one or more layers thereof may be locally weakened in a weakening region to form a hinge around which the composite material or one or more layers thereof can be formed (e.g., bent). The weakening may, for example, be a local material removal and/or a local compression of the material. Weakening may be done by cutting (e.g., laser cutting). The material may be removed along a line (e.g., a straight line). The weakening may be accomplished by locally compressing one or more layers of the composite material. This compression may be irreversible. The material may be compressed along a line (e.g., a straight line).

The weakening region may take any shape allowing for the composite material or one or more layers thereof to be shaped. For example, the weakening region may be in a line (e.g., a generally straight line) to allow for bending or folding. The line may extend from one edge of the material to another to create a panel when folded or bent in a direction at an angle from an adjacent portion. The weakening may form a hinge about which part of the component can be bent relative to another part to form a body. The composite material, or one or more layers thereof, may be placed into a mold die (e.g., to overmold at least a portion of the body). The material, or one or more layers thereof, may be formed by the mold die and/or may be formed prior to insertion into the die.

The present teachings also include methods of forming the composite material. The fibers forming one or more layers of composite material, or the composite material as a whole, may be formed into a nonwoven web using nonwoven processes including, for example, blending fibers (e.g., blending bi-component fibers, conventional staple fibers, or combination thereof), carding, lapping, air laying, mechanical formation, or combination thereof. The fibers of one or more composite layers may be opened and blended using conventional processes. The fibers may be blended within the structure of the fibrous web. A carded web may be cross-lapped or vertically lapped, to form a voluminous nonwoven web. The carded web may be vertically lapped according to processes such as "Struto" or "V-Lap", for example. This construction provides a web with relative high structural integrity in the direction of the thickness of the composite sound absorber, thereby minimizing the probability of the web falling apart during application, or in use. Carding and lapping processes create a nonwoven fiber layer that has good compression resistance through the vertical cross-section and enables the production of a lower mass acoustic treatment, especially with lofting to a higher thickness without adding significant amounts of fiber to the matrix. It is contemplated that a small amount of hollow conjugate fiber (i.e., in a small percentage) may improve lofting capability and resiliency to improve sound absorption. Such an arrangement also provides the ability to achieve a low density web with a relatively low bulk density. An air laid or mechanically formed web may also be produced, though formation of a bulk layer by a lapping process may enable higher thickness at lower weights (or lower densities) as compared to air laying. The web may then be thermally bonded, air bonded, mechanically consolidated, the like, or combination thereof, to form a cohesive nonwoven insulation material. The web may be compressed, which may allow for the porosity of the material to be controlled based on desired properties or to allow the material to be overmolded.

One or more of the layers of the present teachings may be formed from a blend of fibers, including short fibers. One or more layers may be a short fiber technology-based (SFT-based) material. The SFT-based material may be formed using any processes for arranging fibers, such as gravity deposition, air laying, carding, lapping, or any combination thereof. The SFT-based materials may be densified, such as by compressing the materials, calendering the materials, or another employing another method of pressing.

One or more composite layers may be bonded together to create a fibrous sheet. One or more of the layers may be thermally activated. For example, the layers may be activated in an air-circulating oven. The layers may be activated by a heating system. The layers may be activated by IR heating. The layers may then be compressed to a desired thickness. For example, compression may occur through a lamination process or a calendering process. One or more layers may be bonded together by elements present in the layers. For example, binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. One or more adhesives may be used to join two or more layers. The adhesives may be a powder or may be applied in strips, sheets, or as a liquid, for example.

Any arrangement and combination of layers is contemplated. The composite material may include two or more of any layer as described herein. The air-permeable layers may be formed of the same material. The air-permeable layers may be formed of different materials. Any or all of the layers may be co-extensive with one or more of the other layers. One or more of the layers may extend over only part of an adjacent layer.

The layers of the composite material may be formed into a fibrous sheet. As any or all of the layers may contain one or more thermoplastic and/or thermoset materials (e.g., binders), the composite material may be heated and thermoformed into a specifically shaped thermoformed product. Acoustic properties of the composite (and/or its layers) may be impacted by the shape of the composite. The composite, or one or more of its layers, may be generally flat. The finished composite may be fabricated into cut-to-print two-dimensional flat parts for installation into the end user, installer, or customer's assembly. The composite may be formed into any shape. For example, the composite may be molded to generally match the shape of the area to which it will be installed. The finished composite may be molded-to-print into a three-dimensional shape for installation into the end user, installer, or customer's assembly. The three-dimensional geometry of a molded product may provide additional acoustic absorption. The three-dimensional shape may provide structural rigidity and an air space.

The present teachings may include a step of overmolding a fibrous sheet or composite material. The fibrous sheet (e.g., one including one or more fibrous layers, one or more nonwoven layers, one or more films, foils, or facing layers, or a combination thereof) may withstand higher pressures than materials such as a nonwoven layer, such as a needlepunched layer, alone, thereby allowing for a higher pressure to be used during the injecting molding process. For example, a standard injection pressure may be used. The fibrous sheet may be able to withstand such pressures due to the porosity of the material, for example. The fibrous sheet may have areas with local compressions (e.g., where porosity is about 0) that act as a border to prevent any injection material into the fibrous layer or core layer. The fibrous sheet or composite material may be placed into a mold die, where at least a portion of the fibrous sheet or composite material is covered so that it cannot be over molded. It is contemplated that only the intended overmold area may be subjected to the molten overmolding material.

As an example, a fibrous sheet, which may include one or more fibrous layers, one or more nonwoven layers, one or more film, foil, or facing layers, or a combination thereof, may be formed as a generally flat sheet. The fibrous sheet may be fed into a conditioning oven, where it is preheated. For example, the conditioning oven may be heated to a temperature of about 150° C. or greater, about 175° C. or greater, or about 200° C. or greater. The conditioning oven may be heated to a temperature of about 250° C. or less, about 240° C. or less, or about 220° C. or less. The preheated fibrous sheet may be fed to a thermoforming tool, where it is molded into a desired shape and/or to have a desired topography. The molded sheet may have excess material that is trimmed (e.g., via die cutting). The excess material may be recycled. The thermoformed part may then be overmolded to add additional features to the fibrous sheet, thereby forming the finished composite material. It is contemplated that adhesives or other fasteners may be used to at least aid in the installation of the part to its end use location.

For example, one or more sheets of composite material may be shaped to form a generally hollow member, such as an air duct, where the composite material defines one or more channels through which air or another fluid can travel. A single sheet may be thermoformed to form the generally hollow member. Two or more sheets may be thermoformed into a generally hemispherical or half-circular shape, for example. The sheets may be formed to have a lip portion at the edges, and the sheets may be joined together at the lip portions to form a full circle, oval, or other hollow shape. The foil or film layer may be arranged to face outwardly to reduce or prevent air leakage from the generally hollow member such as an air duct.

The finished structure may include one or more features for securing the structure in a desired assembly. For example, the structure, such as an air duct, may include one or more apertures (e.g., formed in a lip portion) for receiving a fastener. The structure may include one or more features molded, adhered, fastened, or otherwise attached to the outer layer of the structure, which may allow for the structure to be dipped or snapped to another element of the assembly. The structure may include a cutout or other feature that allows a temperature sensor to measure and regulate the air flowing through the duct. The finished structure may include one or more bridge segments to join two or more elements, such as air ducts, for example. The finished structure may provide structural support within the assembly. The finished structure may serve to support other parts. The finished structure may exhibit compression resistance to maintain the shape of the duct, to maintain support of other elements within the assembly, or both.

The finished, assembled composite, as a result of layering composite layers, may be a lighter weight and higher performing composite material (e.g., as compared with a denser, heavier, and/or thicker lofted layer, such as those traditionally used). The composite material may have a better value proposition (e.g., performance versus cost) than traditional sound absorption materials. The finished composite material comprises a material whose properties can be adjusted via many methods. Adjustment can be made by the use of one or more materials having a high specific air flow resistance. Adjustment can be made by altering thickness, density, fiber matrix, chemistry, method of bonding, and the like for each layer of the composite.

Figure 3:
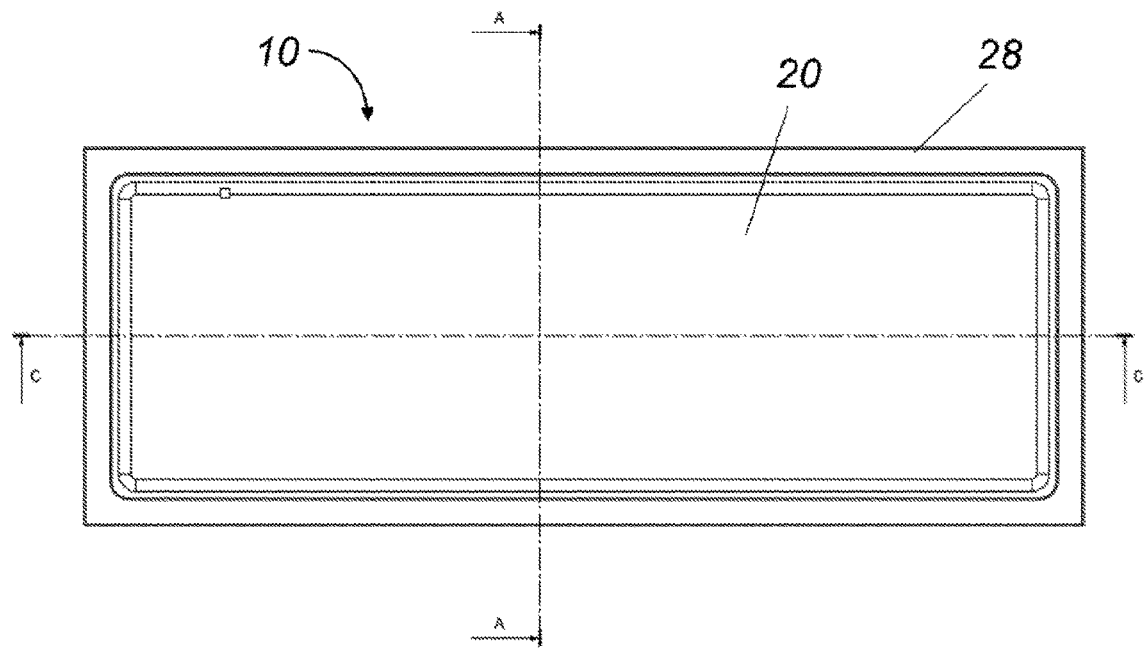
FIG. 3 is an exemplary composite material in accordance with the present teachings.

Turning now to the figures, FIG. 1 illustrates an exemplary fibrous sheet 20 of a composite material 10 (see FIG. 3). The fibrous sheet 20 includes two nonwoven layers 22 with a core material 24 sandwiched therebetween. The nonwoven layer 22 may be a needlepunched layer, a spun-bond layer, a melt-blown layer, a spun-laced layer, or a combination thereof. The core material may be a fibrous nonwoven layer, such as a lapped layer, an air laid layer, a needlepunched layer, a thermoformable layer (e.g., thermoformable short fiber nonwoven layer), other nonwoven layer, or a combination thereof.

Figure 2:
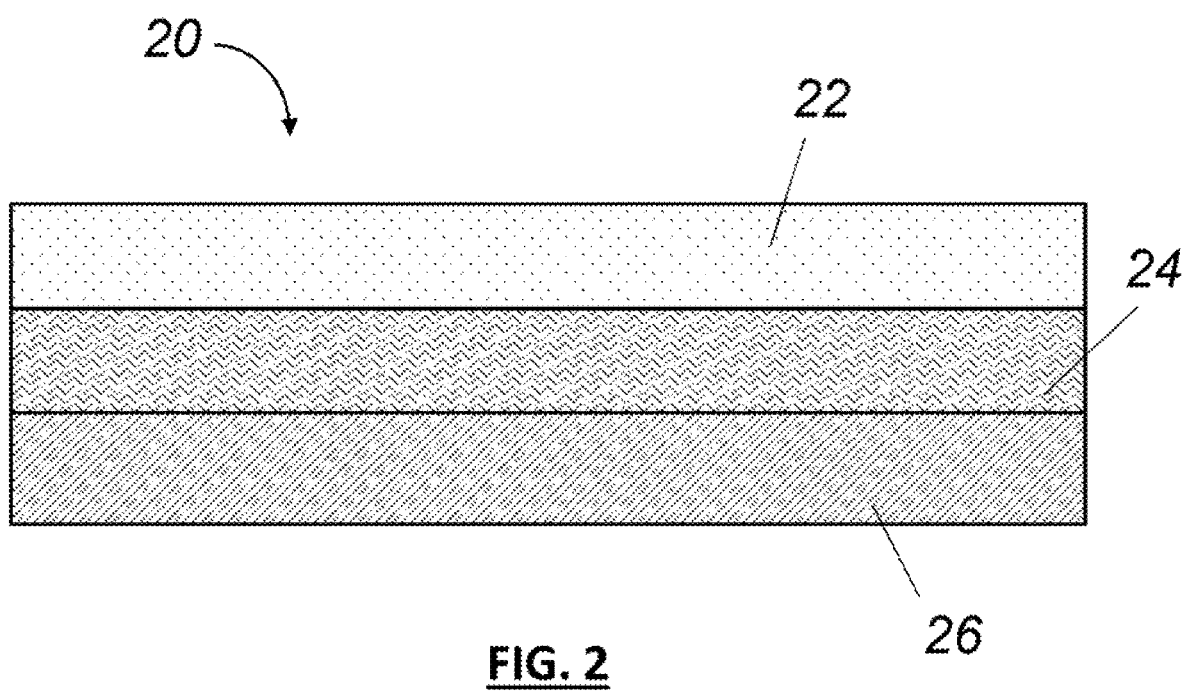
FIG. 2 is a cross-sectional view of a fibrous sheet of a composite material in accordance with the present teachings.

FIG. 2 illustrates an exemplary fibrous sheet 20 of a composite material 10. The fibrous sheet 20 includes a nonwoven layer 22, and a film or foil layer 26, with a core material 24 sandwiched therebetween.

Figure 4:
FIG. 4 is a cross-sectional view of the composite material of FIG. 3 taken along line C-C.

FIG. 3 illustrates an exemplary composite material 10 including a fibrous sheet 20, and an overmolded feature 28, shown in the figure as a border, though the present teachings are not limited to such, FIG. 4 is a cross-section of the composite material 10 of FIG. 3, taken along line C-C. FIG. 5A is a cross-section of the composite material 10 of FIG. 3, taken along line A-A. FIG. 5B is an enlarged view of the circled portion of FIG. 5A. As shown, in FIGS. 5A and 5B, the fibrous sheet 20 has a thickness $T_S$ and a thickness at its edge $T_E$. The overmolded feature 28 has a thickness $T_O$. The thickness of the overmolded feature $T_O$ has a thickness that is greater than the thickness of the edge $T_E$ of the fibrous sheet 20. The thickness at the edge $T_E$ of the fibrous sheet 20 may be an area of localized compression, which keeps the overmold material from reaching the core layer (or at least a portion thereof) of the fibrous sheet.

FIG. 6 illustrates the composite material of the present teachings employed as an air duct 42 within a vehicle assembly 30. The vehicle assembly 30 includes an HVAC system 32 with a fan 34 and an outlet 38 to the vehicle cabin 40. Noise 44 is generated by the fan 34 and/or turbulences. Reflected acoustic waves 46 are illustrated as a result of the acoustic impedance mismatch of the air duct 42. There is also dissipated acoustic energy 48 because of the 0 incidence sound absorption properties of the air duct 42. Acoustic energy 52 is lost inside the dashboard 50 of the vehicle assembly 30 because of sound transparency. Exhaust noise 54 enters the vehicle cabin 40 through the outlet 38 of the HVAC system 32.

Figure 7:
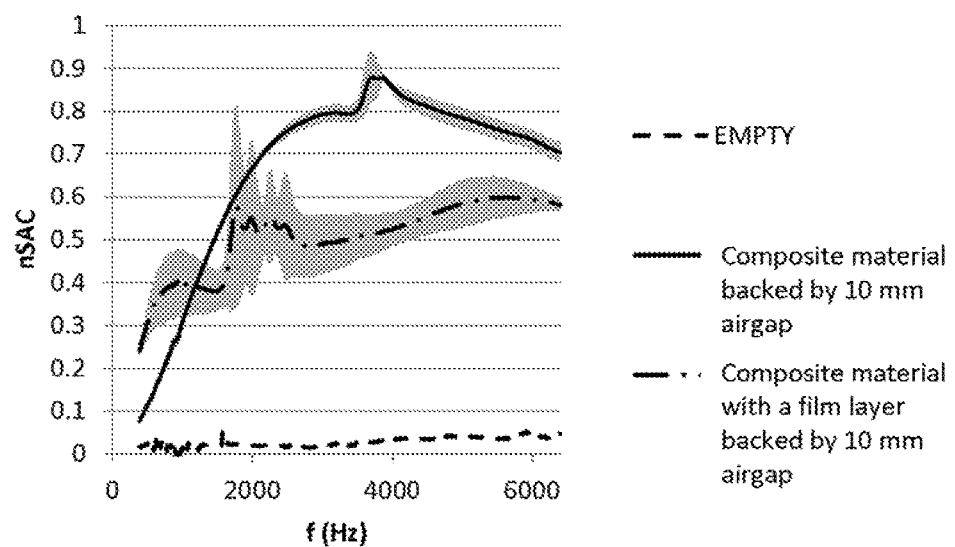
FIG. 7 is a graph showing the normal incidence Sound Absorption Coefficient (nSAC) spectrum of composite materials in accordance with the present teachings.

FIG. 7 is a graph illustrating the normal incidence Sound Absorption Coefficient (nSAC) of materials in accordance with the present teachings measured according to ASTM C384-04 with a 10 mm airgap behind the material. The error bars correspond to the standard deviation between 5 samples. The peaks and dips around 2000 Hz and 4000 HZ correspond to structural resonances that highly depend on boundary conditions, or the way the sample is fixed within the tube during testing. The nSAC may be tuned based on the desired values or properties. A film, for example, may be applied for achieving other properties in addition to acoustic absorption.

Figure 8:
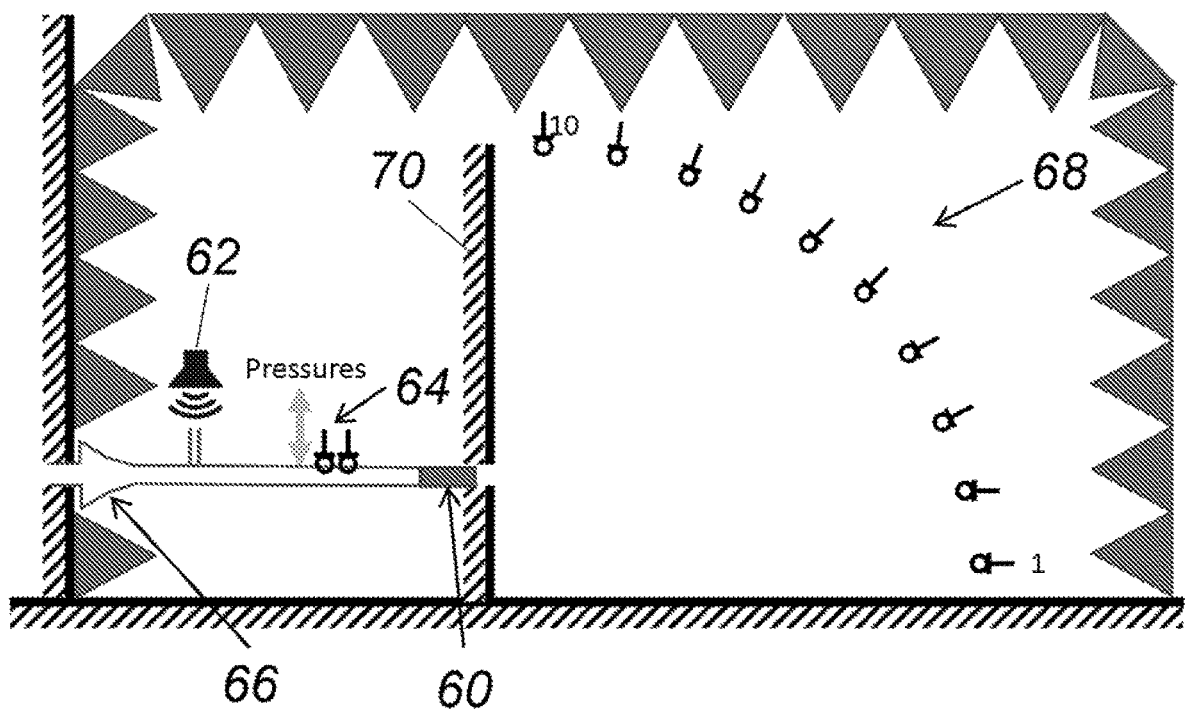
FIG. 8 is an illustration of how testing is conducted to achieve the data shown in the graph of FIG. 9.
Figure 9:
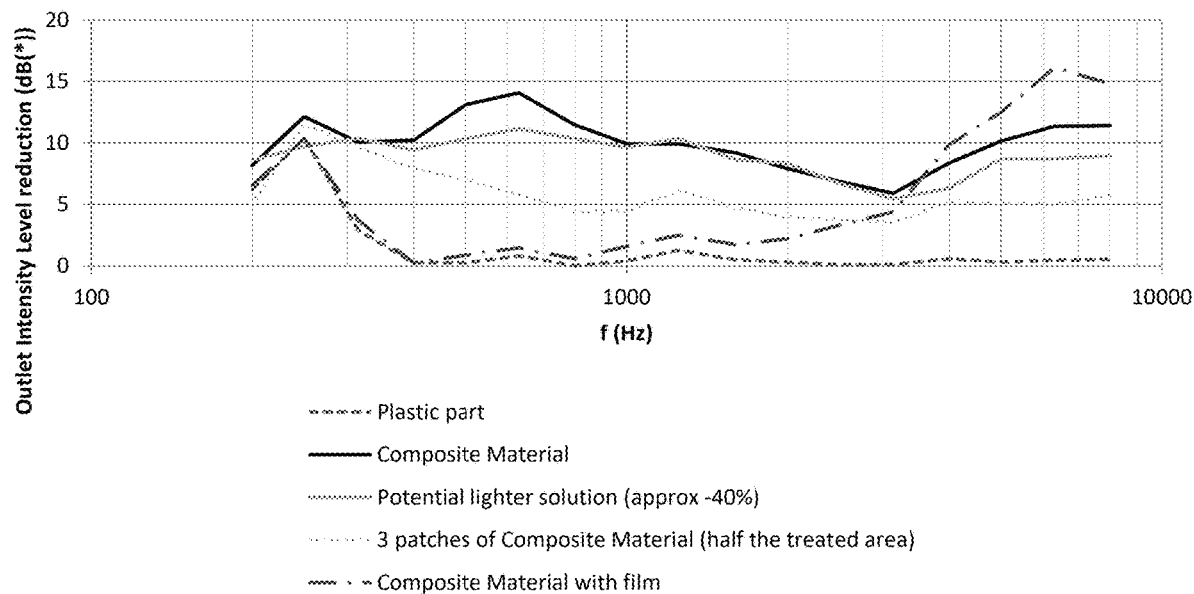
FIG. 9 is a graph showing outlet intensity level reduction for various materials.

FIG. 8 is an illustration of the testing conducted to achieve the data shown in the graph of FIG. 9. A sample 60 made of material in accordance with the present teachings is tested in a chamber having an anechoic ending 66. An acoustic source 62 is introduced to the chamber and is directed toward the sample 60 via microphones 64. A baffle 70 separates the chamber and acoustic source 62 from the area where radiated intensity 68 is measured, according to ASTM 3745. FIG. 9 is a graph comparing the outlet intensity level reduction of different materials, with the Composite Material being the material as described herein. As shown, the Composite Material, with or without film, outperform conventional plastic parts.

Figure 10:
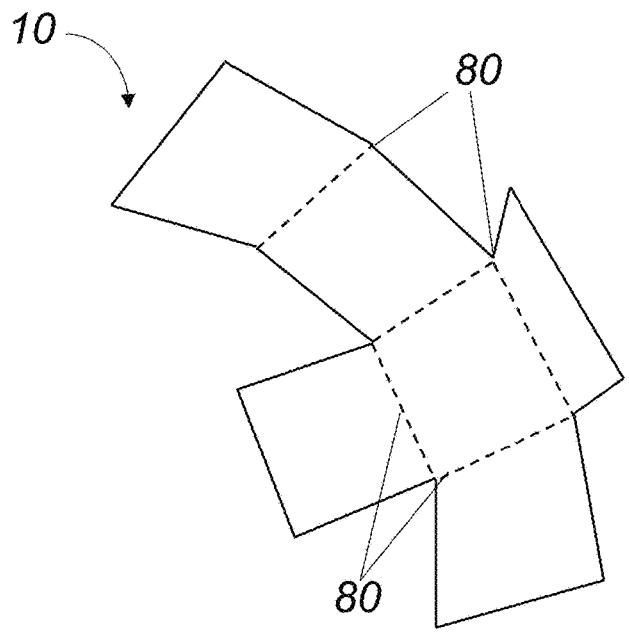
FIG. 10 is an exemplary composite material having weakening areas to allow the composite material to be bent and/or folded to a desired geometry.

FIG. 10 shows an exemplary composite material 10 having one or more weakening areas 80. The weakening areas may be provided by compressing one or more layers of the composite material 10 locally (e.g., along one or more lines). The composite material 10 may be bent and/or folded around these areas. The bending and/or folding may allow for the composite material to be formed as a three-dimensional shaped product, such an as origami-type folding practice or shape, shown here as a cube, though other configurations are possible, such as something having a square, rectangular, triangular, or other polygonal cross-section.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30" inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms comprising or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composite material comprising:
   one or more fibrous sheets formed by a plurality of discrete layers layered on top of each other, the one or more fibrous sheets consisting of:
   a) two nonwoven layers, wherein at least one of the nonwoven layers is a needlepunched layer; and
   b) a core material comprising a fibrous material layer, wherein the fibrous material layer comprises short fibers having an average fiber length of less than 10 mm;
   wherein the core material is sandwiched between the two nonwoven layers;
   wherein each of the nonwoven layers has a weight of 100 grams per square meter or greater to 195 grams per square meter or less;
   wherein each layer of the one or more fibrous sheets is permeable;
   wherein each layer of the one or more fibrous sheets comprises polyethylene terephthalate;
   wherein the composite material includes one or more localized overmolded features over a portion of the composite material from an injection molding process of overmolding material;
   wherein the composite material includes one or more locally compressed areas to inhibit the overmolding material from reaching the fibrous material layer; and
   wherein the composite material is shaped to form an air duct defining one or more channels through which air is permitted to travel.

2. The composite material of claim 1, comprising one or more film, foil, or facing layers located on an outermost surface of the one or more fibrous sheets.

3. The composite material of claim 2, wherein one or more of the film, foil or facing layers has a weight of 50 grams per square meter or less.

4. The composite material of claim 1, wherein one or more of the nonwoven layers and/or core material contact the overmolded features, and wherein materials forming the one or more nonwoven layers and/or core material contacting the overmolded features comprise one or more materials presenting an affinity with the overmolding material.

5. The composite material of claim 4, wherein the materials forming the one or more layers contacting the overmolded features include polypropylene.

6. The composite material of claim 1, wherein the fibrous material layer comprises polyethylene terephthalate and polypropylene.

7. The composite material of claim 1, wherein the composite material comprises two thermoformed fibrous sheets joined at lip portions to form a hollow shape.

8. The composite material of claim 1, wherein the composite material is a single fibrous sheet molded into a three-dimensional part having a hollow shape.

9. The composite material of claim 1, wherein the short fibers of the fibrous material layer have an average fiber length of about 5 mm or less.

10. The composite material of claim 1, wherein each layer of the plurality of discrete layers has a specific air flow resistance that is different from a layer directly adjacent.

11. The composite material of claim 1, wherein the overmolded feature is one or more ribs, clips, fasteners, geometrically accurate joint areas, or a combination thereof.

12. The composite material of claim 1, wherein the composite material exhibits acoustic absorption characteristics and/or acoustic insertion loss characteristics.

13. The composite material of claim 1, wherein the composite material has a porosity of about 55 percent to about 80 percent prior to any optional thermocompression, where the percentage is a volume of the composite material that is air, to facilitate overmolding.

14. The composite material of claim 1, wherein the air duct is a hybrid part having one or more areas with a non-permeable film, foil, or facing, and one or more areas free of the non-permeable film, foil, or facing.

15. A composite material comprising:
   a plurality of discrete layers layered on top of each other to form one or more fibrous sheets, wherein the discrete layers consist of:
   a) two nonwoven layers, wherein the nonwoven layers are needlepunched layers each having a weight of about 100 grams per square meter or greater and about 195 grams per square meter or less; and b) a core material sandwiched between the nonwoven layers, the core material comprising a fibrous material layer, wherein the fibrous material layer comprises short fibers having an average fiber length of about 12 mm or less; and one or more localized overmolded features over a portion of the composite material from an injection molding process of overmolding material;

wherein the composite material includes one or more locally compressed areas to inhibit overmolding material from reaching the fibrous material layer;

wherein the composite material has a porosity of about 55 percent to about 80 percent prior to any optional thermocompression, where the percentage is a volume of the composite material that is air, to facilitate overmolding;

wherein each layer of the plurality of layers has a specific air flow resistance that is different from a layer directly adjacent; and wherein the one or more fibrous sheets are shaped to form an air duct defining one or more channels through which air is permitted to travel.

16. The composite material of claim 15, wherein the nonwoven layers comprise polyethylene terephthalate, and wherein the fibrous material layer comprises polyethylene terephthalate and polypropylene.

17. The composite material of claim 15, wherein the composite material comprises two thermoformed fibrous sheets joined at lip portions to form a hollow shape.

18. The composite material of claim 15, wherein the composite material is a single fibrous sheet molded into a three-dimensional part having a hollow shape.

19. The composite material of claim 15, comprising one or more film, foil, or facing layers located on an outermost surface of the one or more fibrous sheets.

20. The composite material of claim 19, wherein the air duct is a hybrid part having one or more areas with the film, foil, or facing layers, and one or more areas free of the film, foil, or facing layers.

* * * * *